United States Patent [19]
Bell et al.

[11] Patent Number: 5,229,077
[45] Date of Patent: Jul. 20, 1993

[54] SULFUR RATE CONTROL SYSTEM

[75] Inventors: Terry A. Bell, Bel Air; Michael G. Mullendore, Hanover; Thomas E. Kleinfeldt, Ellicott City; Hamilton G. Walker, Jr., Baldwin, all of Md.

[73] Assignee: Environmental Elements Corp., Baltimore, Md.

[21] Appl. No.: 745,689

[22] Filed: Aug. 16, 1991

[51] Int. Cl.$^5$ .............................................. B01D 53/30
[52] U.S. Cl. ......................................... 422/168; 55/5; 55/106; 422/109; 422/111; 423/215.5
[58] Field of Search ............... 422/109, 111, 160, 168; 55/5, 106; 423/533, 543, 215.5

[56] References Cited
U.S. PATENT DOCUMENTS 4,770,674 9/1988 Tellini et al. ........................ 422/111
4,987,839 1/1991 Krigmont et al. ........................ 55/5

OTHER PUBLICATIONS

Mandelik, B. G. and Turner, W., "Selective Oxidation in Sulfuric and Nitric Acid Plants: Current Practices", *Chemical Engineering*, Apr. 25, 1977, pp. 123-130.

Primary Examiner—Robert J. Warden
Assistant Examiner—Timothy M. McMahon
Attorney, Agent, or Firm—Morton J. Rosenberg; David I. Klein

[57] ABSTRACT

A system is provided for maintaining the concentration of sulfur oxides in a flue duct (60) at a predetermined value. The sulfur oxides being maintained at a concentration to substantially optimize the particulate removal performance of an electrostatic precipitator (70). The sulfur rate control system (100) injects sulfur trioxide into the flue gas in proportion to a deficiency in the content of sulfur oxides in the flue gas, with respect to the proportion to particulates being carried by the flue gas. The sulfur trioxide is formed in a catalytic converter (54) which is supplied with sulfur dioxide and oxygen from a reaction chamber (40). The formation of sulfur dioxide is controlled by metering the source of sulfur responsive to a signal provided from a ratio controller (64). Ratio controller (64) supplies an output signal proportional to the difference between a predetermined value based on the particulate flow rate measured by the flow transmitter (66) and the content of sulfur oxides of the flue gas measured by the analyzer (68). The output signal from the ratio controller (64) is coupled to a speed controller (38) having one output (37) for controlling the speed of the sulfur supplying pump (32), and a second output (34) for controlling the position of the damper valve (22), through the actuator (20) and controller (18). Speed controller (38) controls the temperature of the air supplied to the reaction chamber (40) by controlling the electric heater (26) through the driver (28) and temperature controller (30) responsive to a flow transmitter output (35).

7 Claims, 1 Drawing Sheet

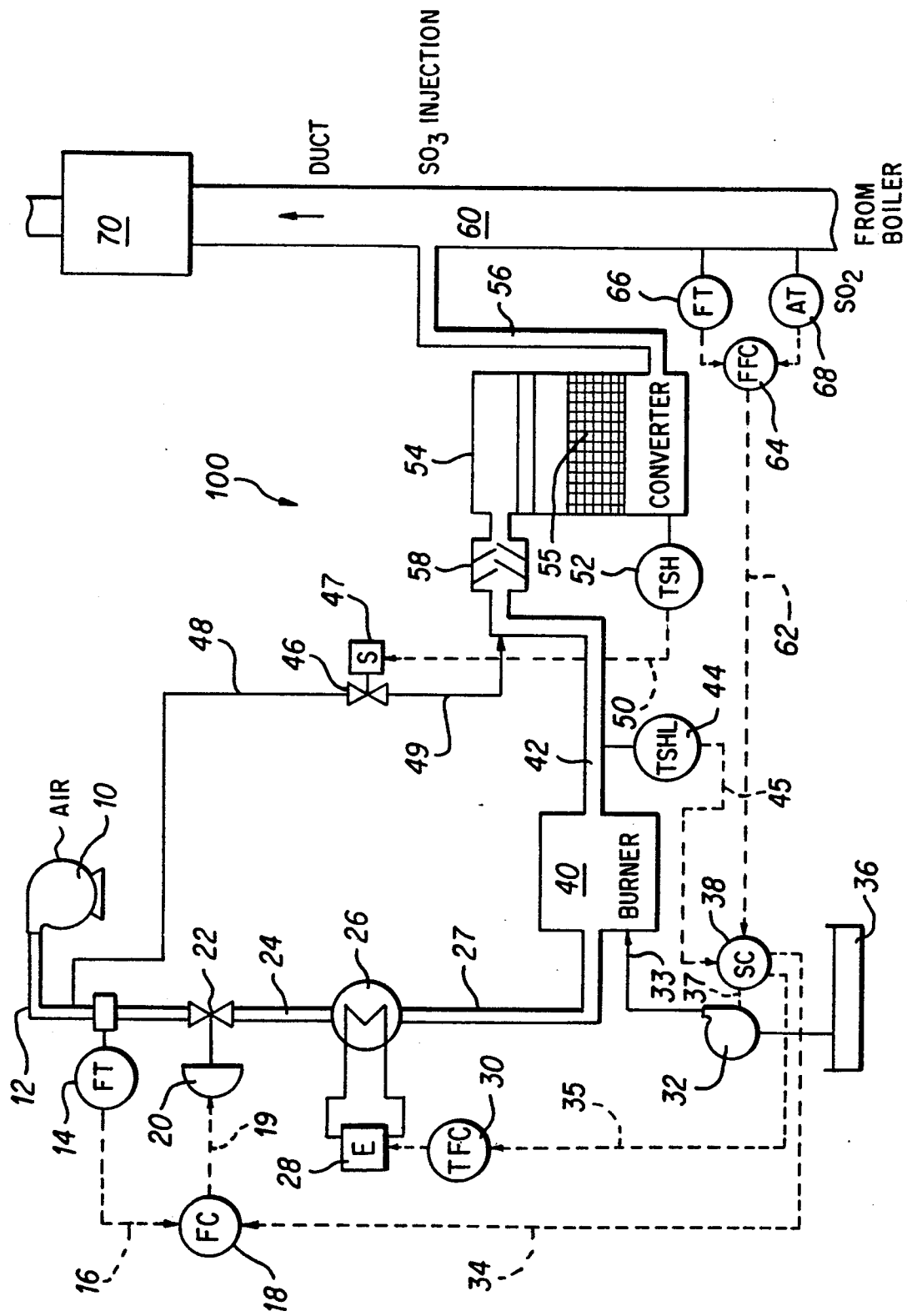

SULFUR RATE CONTROL SYSTEM

BACKGROUND OF THE INVENTION

1. Field of the Invention

This invention directs itself to a flue gas conditioning system for adding sulfur trioxide to a flue gas stream in order to substantially optimize the particulate removal efficiency of an electrostatic precipitator coupled to the flue. In particular, this invention directs itself to a system for adding sulfur trioxide to a flue gas responsive to a control signal proportional to measured characteristics of the flue gas. Still further, this invention directs itself to a system which accurately determines a deficiency in sulfur oxide content of a flue gas by measuring the sulfur dioxide/content of the flue gas and the flow rate of the particulates carried thereby. Further, this invention directs itself to a control system which generates a control signal proportional to the ratio between the two measured flue gas characteristics and utilizes that control signal for controlling the feed rate of sulfur to a reaction chamber wherein sulfur dioxide is formed and subsequently converted to sulfur trioxide for injection into the flue gas.

2. Prior Art

Systems for conditioning flue gas with sulfur trioxide to aid in particulate removal in electrostatic precipitators are known in the art. The best prior art known to the Applicant include U.S. Pat. No. 3,993,429. In such prior art systems sulfur trioxide is added to the flue gas for conditioning thereof responsive to a control signal representing the operating parameters of the boiler generating the flue gas. In such systems the injection of sulfur trioxide into the flue gas is controlled by measuring boiler load signal, representing boiler operating conditions in combination with assumption made about the ash and sulfur content of the coal being burned. This control signal is utilized to control the rate at which sulfur is supplied to the reaction chamber. Such systems fail to accurately supply sulfur trioxide to the flue gas, since they fail to utilize a measurement of the sulfur dioxide content of the flue gas. Further, such prior art systems do not provide any means for measuring the particulate content of the flue gas whereby the ratio of the particulates to sulfur oxide content can be computed for defining a sulfur feed rate to the reaction chamber which accurately results in sufficient sulfur trioxide being added to the flue gas to optimize the electrostatic precipitator performance without releasing sulfur oxides to the atmosphere.

SUMMARY OF THE INVENTION

A sulfur rate control system for substantially optimizing particulate removal performance of an electrostatic precipitator coupled to a flue carrying combustion products of a fossil fuel is provided. The sulfur rate control system includes a subsystem for injecting sulfur trioxide into the flue, upstream of the electrostatic precipitator. The injection of the sulfur trioxide is varied responsive to a proportional control signal. The sulfur rate control system further includes a control subsystem coupled to both the flue and the sulfur trioxide injection subsystem. The control subsystem includes a sensing subsystem for measuring predetermined flue gas characteristics within the flue, upstream of the sulfur trioxide injection subsystem. The control subsystem further includes a signal generating subsystem having an input coupled to the sensing subsystem and an output coupled to the sulfur trioxide injection subsystem, whereby a sulfur content of the flue gas is substantially maintained at a predetermined value for maximizing particulate removal efficiency of the electrostatic precipitator.

BRIEF DESCRIPTION OF THE DRAWINGS

The Drawing FIGURE is a schematic diagram of the sulfur rate control system.

DESCRIPTION OF THE PREFERRED EMBODIMENTS

Referring now to the FIGURE, there is shown sulfur rate control system 100 for maintaining a sulfur oxide content of a flue gas at a predetermined value. As will be seen in following paragraphs, sulfur rate control system 100 is specifically directed to the concept of optimizing the particulate removal performance of an electrostatic precipitator 70 by maintaining a predetermined ratio of oxides of sulfur, sulfur dioxide ($SO_2$) and sulfur trioxide ($SO_3$) to the fly ash content of the effluent from fossil fuel combustion. In particular, when low sulfur bearing coal is burned, for instance in a boiler, $SO_2$ and $SO_3$ are generated as a by-product of combustion. The flue gas emanating from the boiler contains the sulfur oxides and particulates, fly ash, which are carried by the flue duct 60. The fly ash is substantially electrically non-conductive, but the sulfur oxides accumulate on the surface of these particulates, making them more conductive and susceptible to accepting an electric charge, as required for efficient removal by the electrostatic precipitator 70.

When the fossil fuel being burned contains little or very small amounts of sulfur, the lack of sulfur oxides in the flue gas reduces the efficiency of the precipitator. To overcome this problem system 100 incorporates a sulfur trioxide injection subsystem which feeds sufficient sulfur trioxide into the flue gas to maintain the particulate removal efficiency of electrostatic precipitator 70 at a substantially optimum efficiency. However, excess sulfur oxides injected into the flue gas would escape into the atmosphere, which would cause environmental concerns. To insure that the maximum efficiency of the precipitator is maintained, but without injecting excess sulfur trioxide, system 100 includes a sensing subsystem for monitoring the flow rate of particulates and the $SO_2$ content of the flue gas. The output of the sensing subsystem is coupled to a control subsystem for proportioning the injection of sulfur trioxide with respect to the amount of particulates present and the sulfur dioxide trioxide content of the flue gas.

As shown in the FIGURE, the flue gas coming from the boiler is carried by the flue duct 60 to an electrostatic precipitator 70, before being released to the atmosphere. Upstream of the electrostatic precipitator 70 there is provided a sensing subsystem for monitoring the flue gas emanating from the boiler. The sensing subsystem comprises a flow transmitter 66 coupled to flue 60 for measuring the amount of ash coming from the boiler. Although not important to the inventive concept, flow transmitter 66 may be any one of a plurality of flow transmitters for measuring the flow of solids in a gaseous medium such as a Triboflow Model No. 2602, manufactured by Auburn International, of Danvers, Mass. The sensing subsystem further includes a sulfur dioxide analyzer 68, coupled to the flue duct 60 for measuring the content of the sulfur dioxide in the flue gas. One such analyzer may be Model MCS-100 manufactured by Bodenseewerk, Perkin-Elmer GmbH of Meersburg, Germany.

The output from each of the sensing devices 66 and 68 is coupled to the control subsystem of system 100 for generating a signal proportional to the sulfur dioxide deficiency of the flue gas as determined by the difference between a present value based on the quantity of dust present and the actual amount of sulfur dioxide present. The outputs of the flow transmitter 66 and the analyzer 68 are coupled to a ratio controller 64, whose output is determined by the difference between the two input signals with respect to the prescribed preset value for the system. The control subsystem maintains a predetermined optimal ratio between the sulfur oxides and particulates for the flue gas entering the electrostatic precipitor 70. While not important to the inventive concept, ratio controller 64 may be constructed using a programmable logic controller, such as the controller having the manufacturer's designation Series 5 available from Allen-Bradley Company, Inc. of Milwaukee, Wis. The output of the ratio controller 64 is coupled to a pump speed controller 38 by means of the coupling line 62.

Pump speed controller 38 provides an output 37 for controlling the speed of the pump 32, the speed controller also provides an output 35 defining the feed rate of sulfur to the reaction chamber where sulfur dioxide is formed as a first step to forming the sulfur trioxide for injection into the flue gas. Another output 34 of speed controller 38 is used to open valve 22 in the event of an emergency shutdown of sulfur feed pump 32.

Reaction chamber 40 converts the sulfur supplied by pump 32 through the output conduit 33 into sulfur dioxide by combusting it in the presence of heated air, the heated air being in such quantity so as to provide an overabundance of oxygen, the importance of which will be described in following paragraphs. The sulfur dioxide and excess oxygen exits the burner 40 by means of an output duct 42 for subsequent conversion to sulfur trioxide. In order to prevent damage of the output duct 42, or equipment coupled thereto, the temperature of duct 42 is monitored by the over temperature safety switch 44. If the temperature of the burner output conduit 42 exceeds a predetermined threshold value, a signal is provided to the speed controller 38 by means of the signal line 45 to shut off the sulfur feed provided by pump 32.

Air is input to the sulfur trioxide injection subsystem by means of a blower 10 having an outlet conduit 12. The air passing through conduit 12 is subsequently heated by an electric heater 26 before being conveyed to the burner 40 by the conduit 27. Air supplied to burner 40 is maintained at constant volume by means of a damper 22 which is positioned by an actuator 20 responsive to the output of a flow controller 18. Upstream of the damper 22 there is provided a flow measuring device 14 having an output 16 coupled to the flow ratio controller 18. Flow measuring device 14 may be a flow rate measuring device wherein the flow rate is determined by a differential pressure, measured on opposing sides of an orifice, which is well known in the art.

The damper 22 positioned by the actuator 20 provides control of the air fed to the burner 40 at substantially constant volume, supplied through conduit 12 and measured by device 14. Additionally, when an over temperature condition is sensed in the burner outlet conduit 42, by the over temperature safety switch 44, the output 34 of speed controller 38 is modified, altering the signal supplied on line 34 to the flow controller 18, whereby the damper 22 is adjusted to increase the air supply to burner 40 through conduit 27.

The volume of air flowing past damper 22 is supplied to an electric heater 26 through an inlet conduit 24. The heated air exits the heater 26 through the conduit 27 which is coupled to the burner 40. The heater 26 is energized and controlled by a driver 28. The heater control and driver 28 controls the current supplied to the heater 26 for maintaining the air passing through conduit 27 at a predetermined temperature. The predetermined temperature at which the heater 26 is maintained is controlled by the temperature controller 30 responsive to the flow transmitter output signal supplied by the speed controller 38 through the coupling line 35. Thus, the heating of the air supplied to conduit 27 is reduced responsive to operation of the speed controller 38 through its coupling with the temperature controller 30.

As previously described, sulfur, or a sulfur bearing compound is pumped from a supply source 36 to the reaction chamber defined by the burner 40 wherein the sulfur is oxidized in a combustion process having a controlled source of heated air supplied to provide an overabundance of oxygen. The sulfur dioxide is conveyed from the burner 40 to a static in-line mixer 58 before entering the catalytic converter 54. The sulfur dioxide and excess oxygen exiting the burner 40 are coupled to the static in-line mixer 58 by means of the burner outlet duct 42. The in-line mixer 58 insures that the excess oxygen is homogeneously mixed with the sulfur dioxide before entering the catalytic converter 54.

Within catalytic converter 54, the sulfur dioxide and excess oxygen are passed through a bed of vanadium pentoxide 55 for forming sulfur trioxide from the sulfur dioxide and excess oxygen. The sulfur trioxide formed in catalytic converter 54 is coupled to the flue duct 60 my means of the conduit 56. Conduit 56 provides injection of the sulfur trioxide into the flue gas carried by duct 60 at a point upstream from the electrostatic precipitator 70, but downstream of the flue gas measuring devices 66 and 68. Thus, the flue gas is adjusted to contain a sufficient quantity of a sulfur oxide to maintain the efficiency of the electrostatic precipitator at a substantially optimum level.

The catalyst, vanadium pentoxide 55, contained within catalytic converter 54 is susceptible to damage at high temperatures and thus some means for regulating the temperature of catalytic converter 54 is provided. The temperature of converter 54 is controlled by allowing unheated air to mix with the sulfur dioxide fed from burner 40. Unheated air is tapped from the blower outlet conduit 12 and supplied to a safety valve 46 by means of a conduit 48. The unheated air is supplied to the in-line static mixer 58 by means of a conduit 49. The valve 46 is opened responsive to operation of a temperature sensing switch 52, having a signal line output 50 coupled to the actuator 47 for the safety valve 46. When the temperature switch 52 senses that the converter temperature has exceeded a predetermined threshold temperature, the valve 46 is opened to allow unheated air to mix with the combustion products supplied by conduit 42 in the static mixer 58, providing cooling thereof and thereby reducing the temperature of the catalytic converter 54 and the catalyst contained therein.

Utilizing system 100 in combination with an electrostatic precipitator 70 provides a method for substantially optimizing the particulate removal performance thereof. The characteristics of the flue gas are first measured, the key characteristics having been determined to be the flow rate of particulates through the flue duct and the content of the sulfur dioxide in the flue gas. From these measured characteristics a control signal is generated which is proportional to a difference between a predetermined value based on the amount of particulates present and the concentration of sulfur oxides. Lastly, sulfur trioxide is injected into the flue gas in an amount proportional to the deficiency of sulfur oxides in the flue gas, as indicated by the proportional control signal. The controlled generation of sulfur trioxide being provided by controlling the generation of sulfur dioxide in a reaction chamber, and then converting the sulfur dioxide to sulfur trioxide, by contacting sulfur dioxide and air with vanadium pentoxide.

The rate of formation of sulfur dioxide is controlled by metering the quantity of sulfur supplied to the reaction chamber responsive to the proportional control signal. The control of the rate at which sulfur is fed to the burner being controlled by a variable speed pump 32 responsive to the output 37 of the speed controller 38, whose output is responsive to the proportional control signal supplied by the ratio controller 64. The electrical energy supplied to heater 26 is similarly controlled responsive to another output 35 of the speed controller 38 to maintain constant thermal energy in the gases leaving burner 40. Damper 22 is adjusted to maintain constant air volume in conduit 24 in response to a control signal from controller 18 carried by output line 19. Thus, system 100 provides the means by which the flue gas can be accurately trimmed to accurately maintain a predetermined minimum sulfur oxide concentration, required for optimizing the efficiency of the electrostatic precipitator. The accuracy being significantly improved since the measured characteristics of the flue gas are utilized for determining the amount of sulfur trioxide to be added thereto. In addition to ensuring a sufficient content of sulfur oxides in the flue gas to optimize the particulate removal efficiency of the precipitator, the more accurate trimming of the sulfur oxide content of the flue gas by this novel method prevents injection of excess $SO_3$, which would otherwise add to environmental pollution.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or scope of the invention defined in the appended Claims.

What is claimed is:

1. A sulfur rate control system for substantially optimizing particulate removal performance of an electrostatic precipitator in fluid communication with a flue carrying combustion products of a fossil fuel, comprising:

an electrostatic precipitator having an inlet for receiving a flue gas:

means for injecting sulfur trioxide into a flue for mixing with said flue gas at a location preceding entry of said flue gas into said electrostatic precipitator, said injection of sulfur trioxide being varied responsive to a proportional control signal; and, control means coupled to both said flue and said sulfur trioxide injection means for generating said proportional control signal, said control means including (1) means for measuring a sulfur dioxide concentration quantity in said flue gas at a location preceding said sulfur trioxide injection means, (2) means for measuring a flow rate of particulates in said flue gas at a location preceding said sulfur trioxide injection means, and (3) a controller for calculating a ratio between said sulfur dioxide concentration quantity and said flow rate of particulates, said ratio calculating controller having a first input coupled to said sulfur dioxide measuring means and a second input coupled to said particulate flow rate measuring means for generating said proportional control signal in proportion to a difference between a predetermined value and said ratio between said sulfur dioxide concentration quantity and said flow rate of particulates, said ratio controller having an output coupled to said sulfur trioxide injection means for maximizing particulate removal efficiency of said electrostatic precipitator.

2. The sulfur rate control system as recited in claim 1 where said sulfur trioxide injection means includes (1) catalytic converter means having an output in fluid communication with said flue for converting sulfur dioxide into sulfur trioxide, (2) means for forming sulfur dioxide having an output in fluid communication with said catalytic converter means, (3) means for supplying sulfur to said sulfur dioxide forming means responsive to said proportional control signal, and (4) means for supplying air at a substantially constant volume to said sulfur dioxide forming means.

3. The sulfur rate control system as recited in claim 2 where said sulfur supplying means includes a variable speed pump having an input in fluid communication with a sulfur supply and an output in fluid communication with said sulfur dioxide forming means, said variable speed pump being coupled to said ratio calculating controller for supplying sulfur at a predetermined rate responsive to said proportional control signal.

4. The sulfur rate control system as recited in claim 3 where said air supplying means includes (1) an air input line, (2) means for measuring airflow in fluid communication with said air input line, and (3) means for controlling airflow having an input in fluid communication with said air input line and an output in fluid communication with said sulfur dioxide forming means, said airflow controlling means having a first input coupled to said airflow measuring means and a second input coupled to said sulfur supplying means, said airflow controlling means including means for displacing at least one damper responsive to a control signal from said sulfur supplying means and an output signal from said airflow measuring means.

5. The sulfur rate control system as recited in claim 4 where said air supplying means further includes temperature control means in fluid communication with said output of said airflow controlling means for preheating air supplied to said sulfur dioxide forming means responsive to said proportional signal.

6. The sulfur rate control system as recited in claim 5 where said catalytic converter means includes (1) conduit means in fluid communication with said air input line for providing unheated air, and (2) means for introducing unheated air responsive to a temperature sensing switch in fluid communication with said conduit means for substantially preventing said catalytic converter means from exceeding a predetermined temperature.

7. The sulfur rate control system as recited in claim 3 where said sulfur dioxide forming means includes a reaction chamber for oxidizing said sulfur from said sulfur supply in an atmosphere overabundant in air with respect to that which is required to support combustion.

* * * * *